US008689135B2

(12) United States Patent
Portele et al.

(10) Patent No.: US 8,689,135 B2
(45) Date of Patent: Apr. 1, 2014

(54) METHOD OF DRIVING AN INTERACTIVE SYSTEM AND USER INTERFACE SYSTEM

(75) Inventors: Thomas Portele, Bonn (DE); Christian Benien, Rosfeld (DE); Jens Friedemann Marschner, Wuerselen (DE)

(73) Assignee: Koninklijke Philips N.V., Eindhoven (NL)

( * ) Notice: Subject to any disclaimer, the term of this patent is extended or adjusted under 35 U.S.C. 154(b) by 1100 days.

(21) Appl. No.: 12/063,118

(22) PCT Filed: Aug. 2, 2006

(86) PCT No.: PCT/IB2006/052647
§ 371 (c)(1),
(2), (4) Date: Feb. 7, 2008

(87) PCT Pub. No.: WO2007/017805
PCT Pub. Date: Feb. 15, 2007

(65) Prior Publication Data
US 2010/0138779 A1    Jun. 3, 2010

(30) Foreign Application Priority Data

Aug. 11, 2005  (EP) ..................... 05107396

(51) Int. Cl.
*G06F 3/048*   (2013.01)
(52) U.S. Cl.
USPC ........................................................ 715/802
(58) Field of Classification Search
USPC ................ 715/802, 764, 781, 804, 806, 807;
719/318; 345/156
See application file for complete search history.

(56) References Cited

U.S. PATENT DOCUMENTS

| 5,534,887 A | * | 7/1996 | Bates et al. | 715/802 |
| 5,583,537 A | * | 12/1996 | Cocchiaro et al. | 715/856 |
| 5,613,163 A | * | 3/1997 | Marron et al. | 710/59 |
| 5,721,849 A | * | 2/1998 | Amro | 715/802 |
| 5,859,640 A | * | 1/1999 | de Judicibus | 715/808 |

(Continued)

FOREIGN PATENT DOCUMENTS

| EP | 1418498 A2 | 5/2004 |
| JP | 10222337 A | 8/1998 |

(Continued)

*Primary Examiner* — Weilun Lo
*Assistant Examiner* — Dino Kujundzic

(57) ABSTRACT

The invention describes a method of driving an interactive system (1) comprising a user interface system (2) with an inherently sequential input/output modality (12) and comprising a plurality of applications (A1, A2, A3, . . . , An). In this method a first application (A1, A2, A3, . . . , An) is currently controlling the input/output modality (12) for performing an interaction with the user (U), wherein, at least for a certain period of time, a focus level is assigned to the first application (A1, A2, A3, An). The current interaction process of the first application (A1, A2, A3, . . . , An) is only terminated or paused and the control of the input/output modality (12) for performing an interaction is only transferred to a second application (A1, A2, A3, . . . , An) when an application-switching command (ASC) is received from the user (U) and according to the focus level of the first application (A1, A2, A3, . . . , An). Furthermore, an appropriate user interface system (2) with an inherently sequential input/output modality (12) and an interactive system (1) comprising such a user interface system (2) is described.

8 Claims, 2 Drawing Sheets

(56) References Cited

U.S. PATENT DOCUMENTS

| | | | |
|---|---|---|---|
| 6,005,575 A * | 12/1999 | Colleran et al. | 715/807 |
| 6,212,541 B1 * | 4/2001 | McAuliffe et al. | 718/100 |
| 6,233,559 B1 | 5/2001 | Balakrishnan | |
| 7,490,299 B2 * | 2/2009 | Karstens | 715/802 |
| 2003/0014251 A1 | 1/2003 | Pokhariyal et al. | |
| 2003/0227567 A1 | 12/2003 | Plotnick et al. | |
| 2004/0189712 A1 * | 9/2004 | Rundell | 345/808 |
| 2005/0198589 A1 * | 9/2005 | Heikes et al. | 715/802 |
| 2006/0090169 A1 * | 4/2006 | Daniels et al. | 719/320 |

FOREIGN PATENT DOCUMENTS

| | | |
|---|---|---|
| JP | 11232009 A | 8/1999 |
| JP | 2003140798 A | 5/2003 |
| WO | 9950831 A1 | 10/1999 |
| WO | 03096171 A1 | 11/2003 |

* cited by examiner

METHOD OF DRIVING AN INTERACTIVE SYSTEM AND USER INTERFACE SYSTEM

The invention relates to a method of driving an interactive system comprising a user interface with an inherently sequential input/output modality and comprising a plurality of applications. Moreover, the invention relates to an appropriate user interface system with an inherently sequential input/output modality, which can be used by a plurality of applications of an interactive system, independently of each other, for interacting with a user of the interactive system. Furthermore, the invention relates to an interactive system comprising such a user interface system.

Recent developments in the area of man-machine interfaces have led to widespread use of technical devices which are operated through a dialog between a device and the user of the device. Most such "interactive systems" or "dialog systems" are based on the display of visual information and on manual interaction on the part of the user. For instance, almost every mobile telephone is operated by means of an operating dialog based on showing options in a display of the mobile telephone, and the user's pressing the appropriate button to choose a particular option. Advanced user interface systems no longer rely on display, keyboard, mouse, or remote control, but combine several modalities like speech, gestural input, touch etc. With speech-based interactive systems, it is possible to use hands-free and even eyes-free interaction, for example in the home while cooking, in the car, or with small mobile devices. Due to the technological progress with a trend toward a network environment and minimization, for example to smaller and more powerful mobile phones, speech-based services and speech-based devices are technically feasible and are beginning to become a part of everyday life. As on a normal PDA (personal digital assistant), several speech-based applications can run on such a device. One example for an interactive system using a speech-based user interface system to communicate with a user which may be used to control several different applications is described in WO 03/096171 A1.

One issue arising from these "new" input/output modalities is that at least some of them are inherently sequential. While a graphical user interface can display information pertaining to different applications on different regions of the screen, usually in a window frame belong to an application, a speech based input/output modality cannot supply output in parallel. Furthermore, the target application for input from the user cannot be deduced from, for example, the window in which the information was entered. Therefore, methods for the synchronisation and ordering of input and output are required. One possible solution uses activation keywords so that the user can switch between different applications. Thereby, in complex dialogues, where the user switches between several applications and/or is being addressed by several applications, it can happen that the user is no longer sure whether an interaction with a certain application has been brought to a close or whether the application is waiting for a response from the user. This problem can arise in such situations when the user is distracted by events in his surroundings and cannot give his full attention to communication with the interactive system. As a result, owing to misinterpretations, it may happen that the wrong commands are issued, or the application is involuntarily terminated. On the other hand, there are certain situations in which a currently active interaction should under no circumstances be interrupted, for example by sensitive applications such as a money transfer.

It is therefore an object of the invention to provide a method of operation of an interactive system and a corresponding user interface system, which ensures, in a user-friendly way, that undesirable conflicts do not arise between different applications using the same sequential input/output modality, and, in particular, that input errors on the part of the user do not lead to termination of an application at an unfavourable point.

To this end, the present invention provides a method of driving an interactive system comprising a user interface with an inherently sequential input/output modality and comprising a plurality of applications, wherein a first currently interactive application is currently controlling the input/output modality for performing an interaction with the user, wherein, at least for a certain period of time, a focus level is assigned to the first application and wherein the current interaction process of the first application is only terminated or paused, and the control of the input/output modality for performing an interaction is only transferred to a second application when an application-switching command is received from the user, and according to the focus level of the first application.

An appropriate user interface system according to the invention comprises beneath the inherently sequential input/output-modality, which can be used by a plurality of applications, independently from each other, for interacting with a user of the system, an assigning unit for assigning, at least for a certain period of time, a focus level to a first, currently interactive application, which is currently controlling the input/output modality for interacting with the user. Furthermore, user interface system comprises means for receiving an application-switching command from the user and an interaction control unit which is realized in such a way that the current interaction process of the first application is only terminated or paused and the control of the input/output modality for performing an interaction is only transferred to a second application when an application-switching command is received from the user, and according to the focus level of the first application.

Thus, with the aid of the method according to the invention, only one application is active at a certain time and has complete control over the input/output modality. In the meantime, the remaining applications can run in the background. When an active application has completed an interaction with the user, for example when a mailbox application has "read" an e-mail for the user, the application concerned can switch itself to "inactive". In this case, for example, a control module of the system can determine which of the remaining applications is to be switched to "active", or, if no application is to be switched to "active", a special background application without any particular functionality can be regarded as active. As long as one application is interactive, it is not possible for another application to become interactive. In this case, "interactive" means that a dialogue with the user takes place, in contrast to a background activity where the user is not aware that the application is active. One such example would be a mailbox application, which regularly checks mailboxes in the background for new e-mails.

Switching between applications is, according to the invention, only possible through the user, in that the user issues an application-switching command to the system. Thereby, an application-switching command may be any command issued by the user which clearly states that the user wishes to terminate the current interaction with a certain, first, application and start an interaction with a second application. These application-switching commands can be previously supplied, for example by the various applications, to an interaction control unit of the user interface system. The application-switching command can be a spoken command, but can also be a gesture, a button-press, or any suitable action. According to the invention, such an application switch is only possible when allowed by the current focus level of the interactive application. Thus, a focus level which does not allow switching over to another application can be assigned to an application for a certain length of time during an interaction which is not to be interrupted.

In this way, it can relatively easily be ensured, that, on the one hand, the user keeps track of the currently interactive application and only communicates with this application. Thereby, only the user has control over which application is currently using the particular sequential input/output modality. On the other hand, an unintended switching between applications on the part of the user is prevented, so that the interaction cannot involuntarily be interrupted at a critical point.

Insofar as a switching from one application to another does not take place, owing to the focus level, in spite of a command on the part of the user to this effect, this is preferably communicated to the user so that he knows that the current application remains interactive.

The dependent claims and the subsequent description disclose particularly advantageous embodiments and features of the invention. Further developments of the device claim corresponding to the dependent method claims also lie within the scope of the invention.

In the case of complex interactive systems with several applications which can be running in the background, it can often happen that an application wishes to become interactive because a certain event has occurred. One such example would be the arrival of new e-mail for the user in a mailbox application, or, for an automotive interactive system, a warning for the driver that the tank level is low. According to the invention however, as described above, only the user can switch between applications. To this end, in a particularly preferred embodiment of the invention, a second application, which is currently not active and which intends to perform an interaction with the user, sends a notification request to an interaction control unit of the interactive system. Then, the interaction control unit issues a notification to the user according to the focus level of the first application which notification is issued so that it is distinguishable from any output signal of the interaction of the first application.

Therefore, an appropriate user interface system should comprise a means for receiving a notification request from the currently non-interactive second application which intends to perform an interaction with the user, and a means for outputting a corresponding notification to the user upon receiving a notification request, which notification is issued so that it is distinguishable from any output signals of the interaction of the first application. In such a case, the interaction control unit is realised in such way that a notification to the user is issued according to the current focus level of the first application.

In the case of a speech-based input/output modality, an optical signaling element is preferably used for the notification, for example a signal light or similar for drawing the user's attention to the fact that a certain application, which is momentarily not interactive, wishes to communicate something to the user. Alternatively, such a notification can also be made acoustically. In this case however, it should be in the form of a certain sound or melody, so that it is immediately clear to the user that the sound corresponds to a notification and is does not originate from the currently interactive application.

In a preferred embodiment, the user can, for example by means of the input/output modality, request information pertaining to the application which has issued the notification, or why the notification has been issued. In this exception, the current interaction is paused in order to output the requested information to the user, so that he can decide whether to switch from the currently interactive application to the application which has issued the notification.

The notification output also follows the current focus level of the application. For example, three different types of focus level might be available—"open", "notification allowed", and "closed".

If the current interaction is assigned to a first focus level, for example the "closed" focus level, the interaction control unit does not issue a notification to the user until a current interaction process of the first application is terminated or has reached a possible point of interruption. This ensures that the user will not be disturbed by a notification during the interaction with the other application, since at the focus level "closed", a switching-over to another application is not possible anyway. Such a "strict" focus level is particularly relevant if even the user is to be prevented from interrupting the system in order to inquire as to which application issued the notification.

On the other hand, if focus level of "notification allowed" has been assigned to the application, a notification will be issued immediately. However, the user cannot simply switch from the current application to another, but can only inquire about the reason for the notification and pause the current interaction temporarily.

However, if the focus level is set to "open", a notification is issued immediately and the user can switch applications at any time, whereby the user may first request information pertaining to the application which has issued the notification, or he may switch directly, without any request, to the application which has issued the notification.

If the interactive system is informed as to the identity of the user, it is also possible to issue notifications according to the current user, i.e. the notification can be issued in a user-specific manner. One example would be a mailbox application in a home dialog system which can be used by several users. If a new email arrives, a notification is only issued if the user to which the email has been addressed is that user who is currently communicating with the system.

The current focus level of an interactive application is preferably determined automatically, and is determined on the basis of information pertaining to the currently running interaction process, including, for example, information about the type of interaction process.

For example, a money-transfer process might be assigned a focus level of "closed", since such a process should under no circumstances be interrupted by another application, whereas an interactive process concerning, for example, a selection of music for a CD player might be assigned a focus level of "open". Furthermore, information about the timing of the current interactive process can be taken into consideration. For example, a focus level of "closed" can be assigned to an application when the current interaction process is soon to be completed, for example within the next ten seconds, since it might be very annoying for the user to have a longer interaction be interrupted shortly before completion, and therefore to have to repeat the entire interaction.

However, it is preferable to assign such a strict focus level, for example a focus level of "closed", which forbids notification and switching between applications by the user, only for a brief length of time, in order to avoid the user feeling that the system is "in control".

Usually, a notification request is deleted by an application, either after a certain length of time has elapsed, or when the user has switched to the application in question, or has at least learned the reason for the notification or has indicated that he has made note of the notification. When more than one application issues a notification request, the notification mechanism is halted when all issuing applications have deleted their notification requests.

The notification sequence can be specified in a number of ways, for example in the order of the incoming notification requests or by setting priority such as "emergency notification has precedence over other messages". Thereby, personal notifications might be given a higher precedence than general notifications. Equally, it is also possible that the manner of dealing with notifications for a particular user is stored in a user profile for that user.

With the aid of the method described, the user is given, in contrast to other systems, complete control over the system, where, on the one hand, he does not miss out on any important events, and, on the other hand, the system does not interrupt important interactions at an unfavourable point in time, thus avoiding undesirable outcomes.

Other objects and features of the present invention will become apparent from the following detailed descriptions considered in conjunction with the accompanying drawing. It is to be understood, however, that the drawings are designed solely for the purposes of illustration and not as a definition of the limits of the invention.

Figure 1:
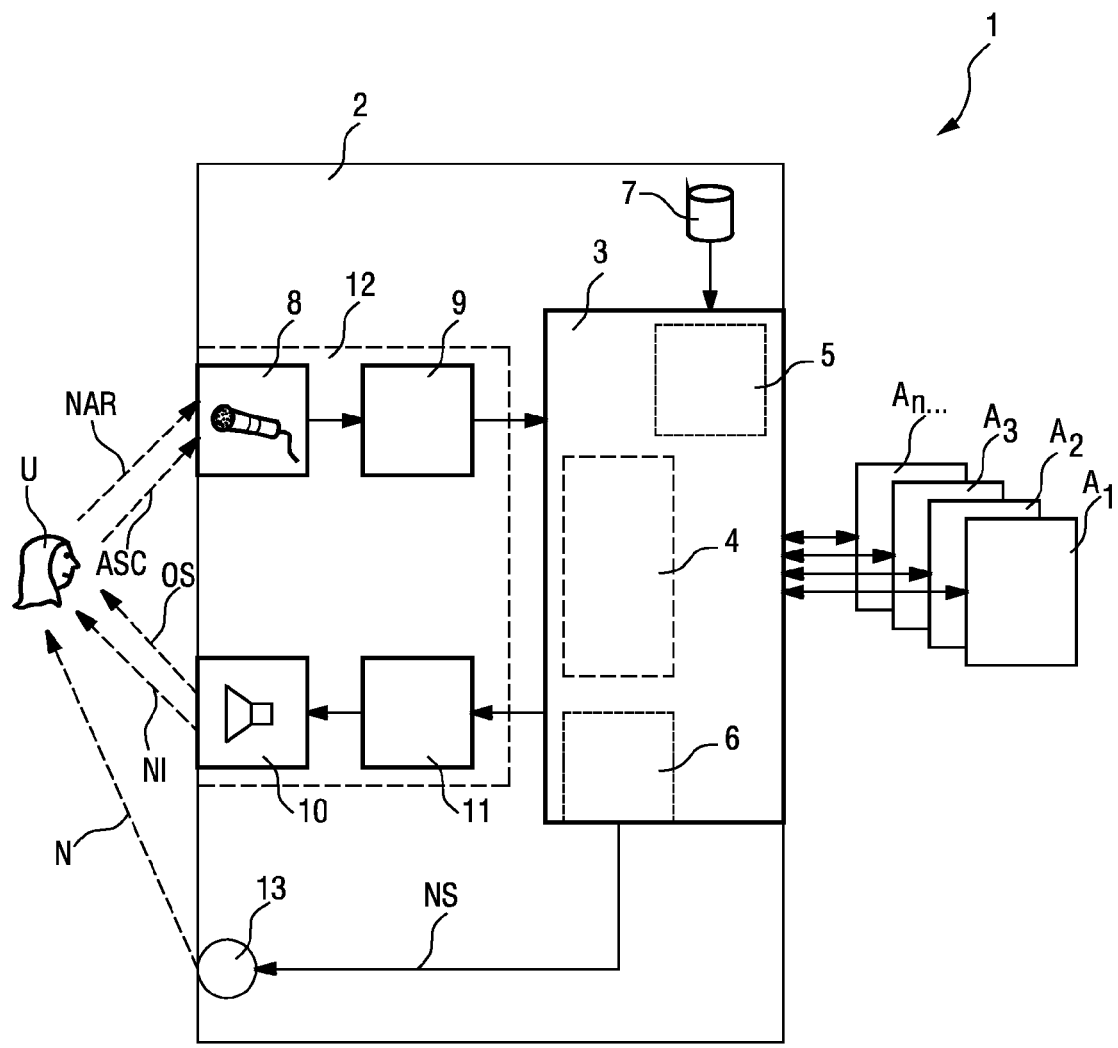
FIG. 1 is a schematic representation of an interactive system comprising a number of components according to an embodiment of the invention.

FIG. 1 shows an interactive system 1, comprising a user interface system 2 and several applications $A_1, A_2, A_3, \ldots, A_n$. This interactive system 1 can be a system similar to that described in WO 03/096171 A1, which is incorporated here by reference.

The user interface system 2 shown here features a speech-based input/output system as input/output modality 12. This input/output modality 12 comprises, on the input side, a microphone 8 for detecting speech input of the user U, and a speech recognition arrangement 9, which can comprise the usual speech recognition module and a following language understanding module, so that speech utterances of the user U can be converted into digital form. On the output side, the input/output modality features a speech synthesis arrangement 11, which can comprise, for example, a language generation unit and a speech synthesis unit. The synthesised speech is then output to the user U by means of a loudspeaker 10. The signal output from the speech recognition arrangement 9 is forwarded to an interaction control unit 3 of the user interface 2. This interaction control unit 3 can comprise a usual dialog manager 4, which analyses commands originating from the speech recognition arrangement 9, directs them as appropriate to the currently active application, and deals with the output of information and other prompts according to application $A_1, A_2, A_3, \ldots, A_n$ via the speech synthesis unit 11. All of the components of the input/output modality 12 mentioned here, in particular the speech recognition arrangement 9 and the speech synthesis arrangement 11, as well as the dialog manager 4 and the required interfaces (not shown in the diagram) between the dialog manager 4 and the individual applications $A_1, A_2, A_3, \ldots, A_n$, are known to a person skilled in the art and will therefore not be described in more detail.

The interaction control unit 3, along with the dialog manager 4 and further components yet to be described, as well as the speech recognition arrangement 9 and the speech synthesis arrangement 11 with their subordinate modules can be realised in the form of a software running on a suitable processor of a computer, PDA, mobile telephone, etc. Equally, the applications $A_1, A_2, A_3, \ldots, A_n$ can be realised in the form of software, depending on the application, running at least partially on the same processor or on a processor connected to that processor.

Furthermore, the user interface system 2 can comprise additional input/output modalities, for example a screen, a touchpad, a keyboard, a camera, for example to register movement of the user and to convert these to commands. For the sake of clarity, these additional input/output modalities are not shown in FIG. 1.

According to the invention, the user interface system 2 comprises an assigning unit 5 which in this case can, at least partially, be part of the interaction control unit 3. This assigning unit 5 ensures that an $A_1, A_2, A_3, \ldots, A_n$, which is currently interactive and communicating with the user, i.e. which momentarily has control over the input/output modality, is assigned a focus level. The assigning of the focus level is carried out automatically according to certain rules, which can be stored, for example, in a database or memory 7.

The interaction control unit 3 is realised in such a way, that only one of the applications $A_1, A_2, A_3, \ldots, A_n$ controls the input/output modality 12 and its subordinate components at any one time. During this time, other applications $A_1, A_2, A_3, \ldots, A_n$ cannot avail of the input/output modality 12. Only the user U can, by means of an appropriate application-switching command ASC, switch from one application to another, i.e. that a currently interactive application is interrupted, and the desired application is given the control over the input/output modality 12. The application-switching command ASC can be certain keyword which directly addresses a non-interactive application $A_1, A_2, A_3, \ldots, A_n$ and which is stored in the interaction control unit 3 or a memory associated therewith.

A notification unit 6 can, under certain circumstances, issue notifications to a user U from a non-interactive application $A_1, A_2, A_3, \ldots, A_n$. To this end, with the aid of a notification signal NS, the notification unit 6 causes, for example, a light 13 to flash, thereby drawing the attention of the user U to the notification given by the flashing light 13. The notification unit 6 decides, according to a process described below, when which notification is to be output. The notification unit 6 is also part of the interaction control unit 3.

The signal light 13 ensures that the notification N is clearly distinguishable from the output signals OS of the currently interactive application which are output by means of the loudspeaker 10 of the input/output modality 12 in the form of speech, so that the user U immediately knows that the notification N has nothing to do with the current interaction.

The method of operation of the system will be described, with the aid of a very simple example showing only two applications, in FIG. 2. In this case, for the sake of simplicity, it is also assumed that there are only two different focus levels—"closed" and "open". When the interactive application is assigned a focus level of "closed", it is not possible for the other application to issue a notification, neither can the user interrupt the running interaction of the application. However, if the interactive application is assigned a focus level of "open", notifications of the other application are output to the user, and the user can switch between the two applications.

The process commences with step I, in which the first application is started, for example a banking software. In step V, a current focus level is assigned by the assigning unit 5 to the first application. This occurs at, preferably regular, intervals and/or at a dialog output of the system and/or at a dialog input of the user, depending on which interactions are being carried out in parallel by the first application. For example, the focus level can initially be set to "open". As soon as a money transfer is initiated, and a subsequent interruption could lead to an erroneous or double booking, the focus level is changed to "closed". To this end, the assigning unit comprises a data base or similar, in which focus levels are assigned to the various processes or process parts. Evidently, it is also possible that the application itself, before commencing certain procedures, requests a focus level of "closed" and the assigning unit 5 decides whether the requested focus level is to be assigned, and, if so, for how long.

Since the application that is not currently interactive but is running in the background might have a notification for the user, it may issue a notification request to the interaction control unit 3. Therefore, in a loop in process step VI, a possible notification request of the second application is polled at regular intervals. This loop runs continually whilst the normal interaction process of the first application continues in step II. If step VI determines that a notification request of the second application is present, the process step VII first checks whether the current focus level of the first application is set to "closed".

Should this be the case, another loop in step VIII continues to determine the current focus level of the currently interactive application, and step VII continues to check whether the current focus level is still set to "closed".

As soon as the current focus level has been changed from "closed" to "open", a notification is issued in step IX.

Subsequently, the system waits in step X for an application-switching command from the user U. The interactions of the current application continue to run in the meantime (step II).

Only when an application-switching command has been detected in step X, will the current interaction of the first application be interrupted in step III, and the second application be started in step IV. In step V', a focus level is immediately assigned to the second application, in the same way as for the first application.

The process described above with the aid of FIG. 2, is, as already mentioned, an extremely simplified example with only two applications for the purpose of explaining the process of operation of the method pursuant to the invention. Evidently, the process will be considerably more complex in the case of a larger number of applications, since notification requests for the various applications must regularly be polled.

Figure 2:
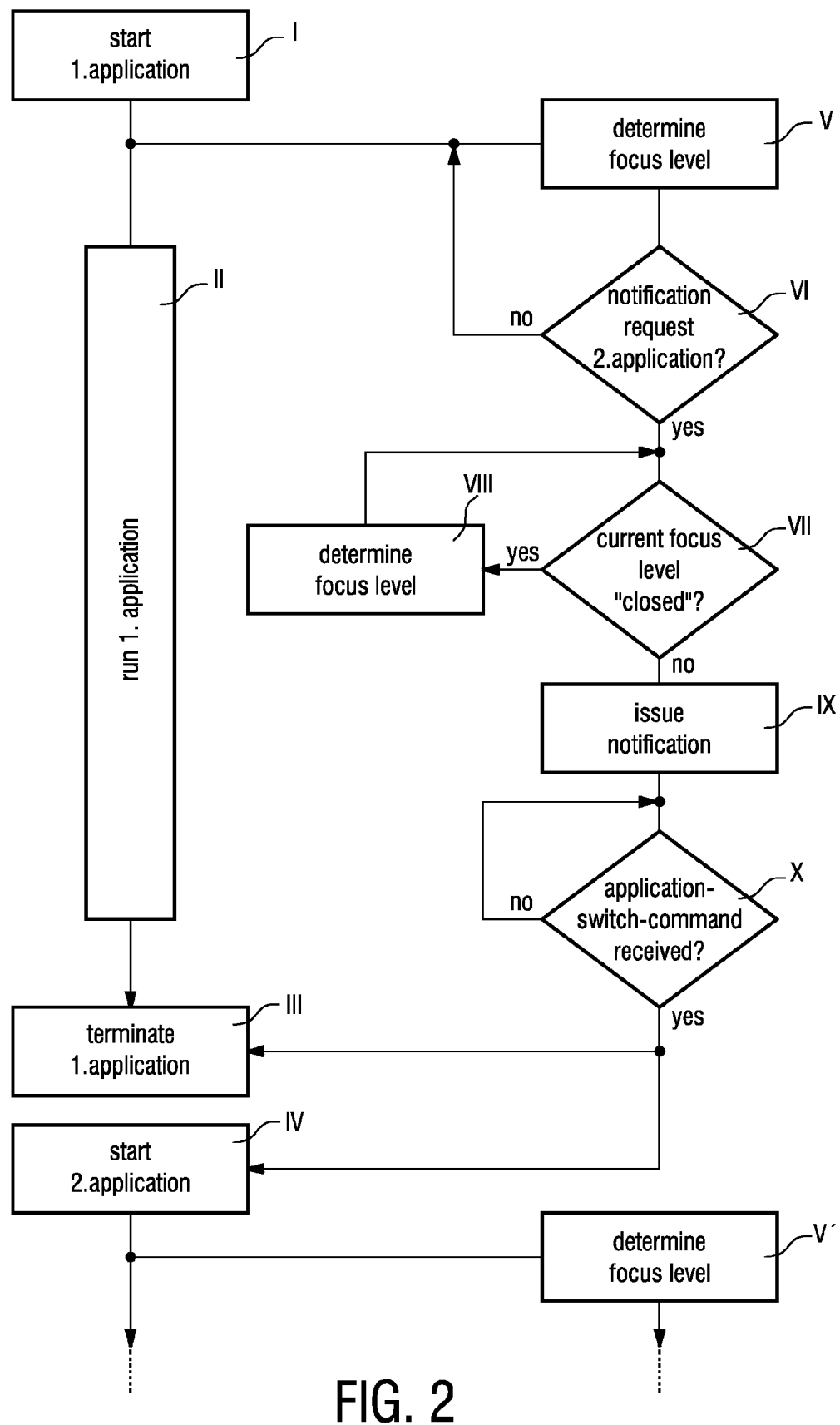
FIG. 2 shows a flow chart of a possible sequence of actions of the method pursuant to an embodiment the invention.

Also, the process illustrated in FIG. 2 does not show that the user U, once his attention is drawn by a notification, can issue a request NAR to the user interface system 2 (c.f. FIG. 1) to determine which application has issued the notification, for example in the form of a question "What's up, system?". Such a request NAR is recognised as such by the dialog manager 4, and the interaction control unit 3 subsequently ensures that a corresponding notification information NI is output, informing the user U which application issued the notification. If the application which has issued the notification is a type of messaging application, for example a mailbox application, the message—if it is short—can be output directly as notification information. The notification request is then deleted by the corresponding application, so that no further notification is output to the user, i.e. the signal light 13 is then deactivated by the notification unit.

Although the present invention has been disclosed in the form of preferred embodiments and variations thereon, it will be understood that numerous additional modifications and variations could be made thereto without departing from the scope of the invention. For example, the output rendering modules described are merely examples, which can be supplemented or modified by a person skilled in the art, without leaving the scope of the invention. Furthermore, the manner of notification can depend on priority, so that the user is informed in a particular way in the case of a particularly urgent notification so that he is made aware of the urgency.

For the sake of clarity, it is to be understood that the use of "a" or "an" throughout this application does not exclude a plurality, and "comprising" does not exclude other steps or elements.

The invention claimed is:

1. A method of driving an interactive system (1) comprising a user interface system (2) with an inherently sequential input/output modality (12) and comprising a plurality of applications ($A_1, A_2, A_3, \ldots, A_n$), wherein a first application ($A_1, A_2, A_3, \ldots, A_n$) is assigned a focus level and is currently controlling the inherently sequential input/output modality (12) for performing an interaction with a user (U), at least for a certain period of time based on information pertaining to type of current interaction process of said first application and a state of operation of said interaction, wherein in a first focus level the first application is uninterruptable and in a second focus level the first application is interruptible; and wherein a second application ($A_1, A_2, A_3, \ldots, A_n$), which is currently not interactive and which is configured to perform an interaction with the user (U), sends a notification request to an interaction control unit (3), and wherein responsive to the notification request, the interaction control unit (3):

determines a focus level of said first application;

issues a notification (N) to the user (U) when the current interaction process of the first application ($A_1, A_2, A_3, \ldots, A_n$) is terminated or is assigned to at least the second focus level; said-notification (N) being distinguishable from any output signals (OS) of the interaction of the first application ($A_1, A_2, A_3, \ldots, A_n$);

wherein the current interaction process of the first application ($A_1, A_2, A_3, \ldots, A_n$), responsive to said notification (N), is one of:

terminated, and the control of the inherently sequential input/output modality (12) for performing interaction is transferred to the second application ($A_1, A_2, A_3, \ldots, A_n$) according to the focus level of the first application ($A_1, A_2, A_3, \ldots, A_n$) not being in the first focus level and in response to an application-switching command (ASC) received from the user (U); and paused, for a limited period of time, to allow for a request for information regarding said notification (N) during said limited period of time, wherein control of the inherently sequential input/output modality (12) remains with said first application.

2. The method according to claim 1, wherein the focus level of an interactive application ($A_1, A_2, A_3, \ldots, A_n$) is automatically determined.

3. The method according to claim 1, wherein the information pertaining to the current interaction process is stored in at least one of a data base and a memory.

4. The method according to claim 1, wherein the inherently sequential input/output modality (12) of the user interface is speech-based.

5. The method according to claim 1, wherein the notification (N) is issued using an optical signalling element (13).

6. The method according to claim 1, wherein, upon a request (NAR) by the user (U), an information (NI) is rendered by the user interface system (2) pertaining to the application ($A_1, A_2, A_3, \ldots, A_n$) which has issued the notification (N).

7. The method according to claim 1, wherein the notification (N) is issued depending on the user (U) of the interactive system (1).

8. A user interface system (2) with an inherently sequential input/output modality (12), which can be used by a plurality of applications ($A_1, A_2, A_3, \ldots, A_n$) of an interactive system (1), independently of each other, for interacting with a user (U) of the interactive system (1), said system comprising:

- an assigning unit (5) for assigning a focus level to a first, currently interactive application ($A_1, A_2, A_3, \ldots, A_n$), which is currently controlling the inherently sequential input/output modality (12) for interacting with the user (U), said focus level being assigned, at least for a certain period of time, based on information pertaining to type of current interaction process of said first application and a state of operation of said current interaction process, wherein in a first focus level the first application is uninterruptable and in a second focus level the first application is interruptible for a limited period of time;
- means (12, 4) for receiving an application-switching command from the user (U);
- means for receiving a notification request from a second application ($A_1, A_2, A_3, \ldots, A_n$), which is currently not interactive and is configured to perform an interaction with the user (U),
- means (6, 13) for outputting a notification (N) to the user upon receiving a notification request when the first application is not in the first focus level, said notification being distinguishable from any output signals (OS) of the interaction of the first application ($A_1, A_2, A_3, \ldots, A_n$),
- an interaction control unit (3), responsive to said notification (N), causing the current process of the first application ($A_1, A_2, A_3, \ldots, A_n$) to be one of:
- terminated and the control of the inherently sequential input/output modality (12) for performing an interaction transferred to the second application ($A_1, A_2, A_3, \ldots, A_n$) when the focus level of the first application ($A_1, A_2, A_3, \ldots, A_n$) is not in the first focus level and in response to the application-switching command (ASR) received from the user (U); and
- paused, for a limited period of time, to allow for a request for information regarding said notification (N) during said limited period of time, wherein control of the inherently sequential input/output modality (12) remains with said first application.

* * * * *